Patented Sept. 8, 1925.

1,552,799

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.  Application filed February 23, 1923. Serial No. 620,610.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, but is not limited, to ethers having that property. While cellulose ethers may form thin solutions in the lower monohydroxy aliphatic alcohols or even in mono or dibrom benzene, it has been found that such single solvents by themselves do not dissolve a sufficient proportion of the ethers to make a desirably thick flowable composition or dope, such as is preferred in the manufacture of photographic film base and in other plastic manufacturing processes.

I have discovered that mixtures of mono or dibrom benzene or both of them with one or more of the lower monohydroxy aliphatic alcohols form adequately strong and useful solvents by means of which ether solutions of the desired strength may be prepared. By lower monohydroxy aliphatic alcohols I mean those having less than six carbon atoms. Mono and dibrom benzenes are typical brom-nucleo substitution products of benzene. The homologues, such as mono brom toluene, act equivalently. The ingredients may be combined in widely varying proportions. By way of example I may mix mono brom benzene with an equal weight of methyl alcohol. In from 5 to 7 parts of such mixture I may dissolve 1 part of cellulose ether, say water-insoluble ethyl cellulose to obtain a viscous flowable solution suitable for manufacture of film base in the regular way. The ingredients by themselves do not dissolve enough of the ether to form solutions of such strength. Of course, the proportion of solvent mixture may be increased when the dope or flowable composition is to be used for lacquering, as will be understood by those skilled in the art.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

In the formation of film a considerable amount of the bromine derivative of benzene remains behind when the more volatile ingredients evaporate. This is due to its relatively low volatility. It imparts plasticity and other useful properties to the film.

Having thus described my invention, what I claim as new and desire to secure by Letters Patent is:

1. A composition of matter comprising cellulose ether and a bromo-nucleo substitution product of one of the group benzene and its homologues, the ingredients being homogeneously mixed in unprecipitated form.

2. A composition of matter comprising cellulose ether dissolved in a mixture of a lower monohydroxy aliphatic alcohol and a bromo-nucleo substitution product of one of the group benzene and its homologues.

3. A composition of matter comprising cellulose ether and mono brom benzene, the ingredients being homogeneously mixed in unprecipitated form.

4. A flowable composition of matter comprising cellulose ether dissolved in a mixture of mono brom benzene and methyl alcohol.

5. A composition of matter comprising 1 part of cellulose ether dissolved in from 5 to 7 parts by weight of a mixture of a lower monohydroxy aliphatic alcohol and a bromonucleo substitution product of one of the group benzene and its homologues.

6. A composition of matter comprising cellulose ether dissolved in a mixture of substantially equal parts by weight of mono brom benzene and methyl alcohol.

7. A composition of matter comprising approximately 2 parts by weight of water insoluble ethyl cellulose, 7 parts of mono brom benzene and 7 parts of methyl alcohol.

8. As an article of manufacture, a deposited or flowed film comprising ethyl cellulose and a bromo-nucleo substitution product of one of the group benzene and its homologues.

9. A flexible transparent film comprising water-insoluble ethyl cellulose and mono brom benzene.

Signed at Rochester, New York, this 14th day of February, 1923.

JOHN M. DONOHUE.